Oct. 13, 1959  R. J. HENGSTEBECK  2,908,653
REACTION-REGENERATION SYSTEM FOR HYDROFORMING
NAPHTHA WITH SUPPORTED PLATINUM CATALYST
Filed April 20, 1955
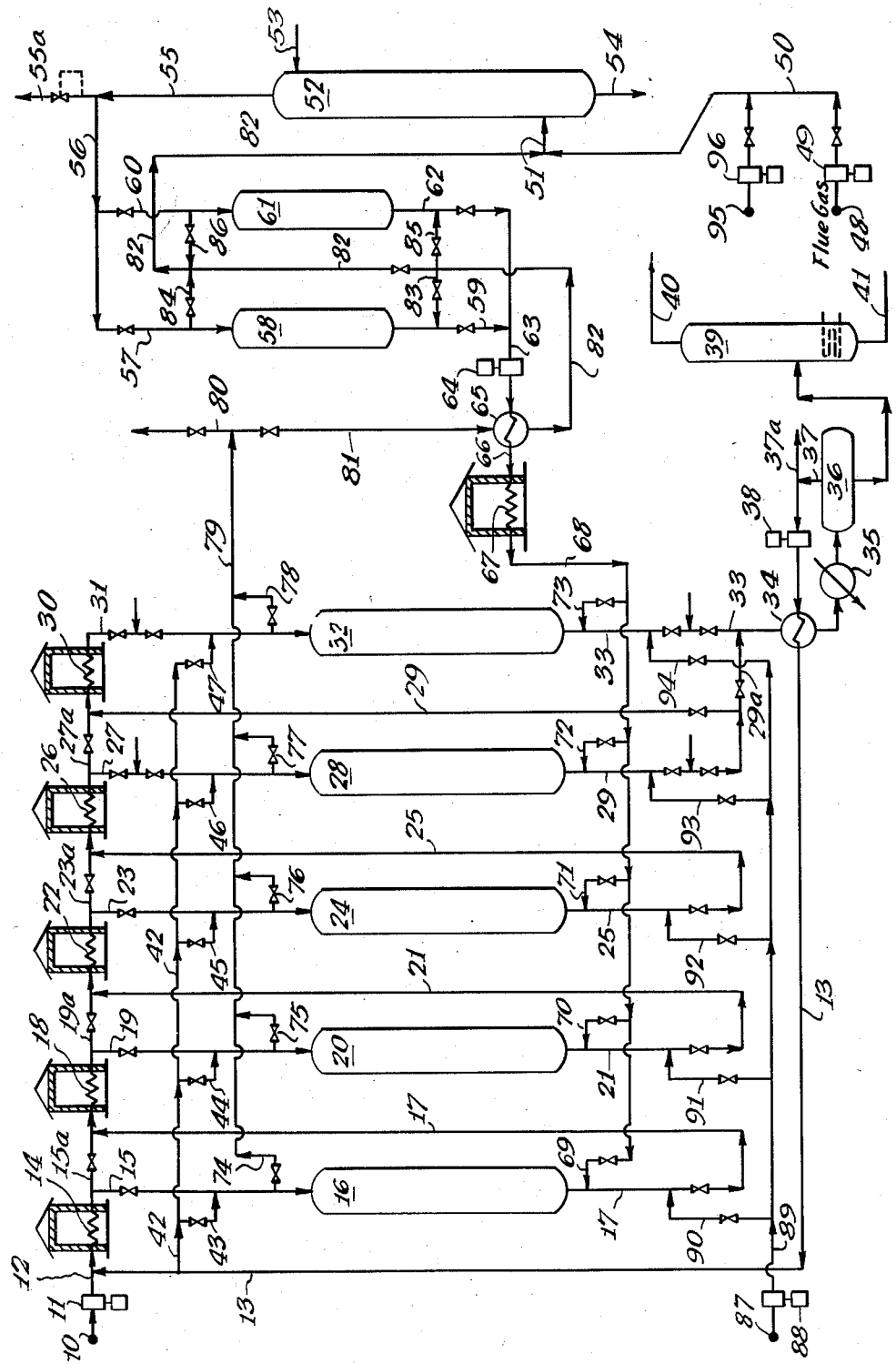

United States Patent Office 2,908,653
Patented Oct. 13, 1959

2,908,653

REACTION-REGENERATION SYSTEM FOR HYDROFORMING NAPHTHA WITH SUPPORTED PLATINUM CATALYST

Robert J. Hengstebeck, Valparaiso, Ind., assignor to Standard Oil Company, Chicago, Ill., a corporation of Indiana Application April 20, 1955, Serial No. 502,605

3 Claims. (Cl. 252—416)

This invention relates to a reaction-regeneration system for the hydroforming of naphtha with a supported platinum catalyst, and it pertains more particularly to an improved system for regenerating catalyst in one of a series of reactors while the remaining reactors are on-stream.

The first commercial naphtha hydroforming system employing supported platinum catalyst, the so-called Platforming process, was of the continuous or non-regenerative type which required operation at pressures of about 500 p.s.i.g. or higher in order to obtain run lengths of the desired duration after which the catalyst was replaced; this avoided the expense of regeneration equipment but it sacrificed the flexibility and the high "yield-octane" performance attainable by operations at lower pressures. More recent supported platinum catalyst hydroforming processes, such as the Ultraforming process (Petroleum Engineer, vol. XXVI, April 1954, at page C–35), are operated at low pressures, usually in the range of about 200 to 400 p.s.i.g., and are provided with regeneration facilities which are separate and distinct from equipment employed in on-stream operations. Heretofore regeneration systems have either required the use of a swing reactor, which added materially to the capital investment cost, or required shutdown of the unit for effecting regeneration which not only decreased available on-stream performance but required frequent shut-down and start-up procedures. The object of this invention is to provide a regenerative, supported platinum catalyst hydroforming system which avoids a substantial portion of the investment heretofore required in a swing reactor system but which retains the flexibility and other operating advantages of enabling selective regeneration of catalyst in any of the reactors while the remaining reactors are on-stream.

A further object of the invention is to provide an improved method and means for drying gases employed in purging and regeneration steps; this is important because the presence of substantial amounts of water in purging and regeneration gases tends to decrease catalyst activity. Other objects will be apparent as the detailed description of the invention proceeds.

In accordance with my invention cut-off valves or blinds are provided in the inlet and outlet lines associated with each reactor so that each reactor may be isolated from the on-stream system. Cross-over lines are provided so that the naphtha-hydrogen stream may by-pass any reactor which is blocked out of the system; these cross-over lines may by-pass one or more of the heaters or they may, in effect, connect two heaters to temporarily operate in series. It may be desirable to reduce the naphtha charge rate to the system while catalyst in one of the reactors is undergoing regeneration but this is not always essential.

Each of the reactors may be designed for effecting catalyst rejuvenation as well as regeneration, in which case the inlet and outlet lines to the blocked-out reactor should be provided with double valves or blinds with provision for introducing or flowing a seal gas therebetween. A considerable savings in investment may be effected by designing only the last and next-to-last reactor for rejuvenation since catalyst in these reactors require most frequent regeneration; in such cases the catalyst from these last two reactors may be interchanged with catalyst from preceding reactors during such time that the entire plant is shut down for repair and inspection.

As pointed out in co-pending application Serial No. 416,072, filed March 15, 1954, now U.S. 2,892,770, it is desirable that water be removed from flue gases employed during purging and regeneration steps since the presence of water during these steps has a deleterious effect on catalyst activity. A feature of my invention is an improved method and means for drying hot, recirculated flue gases which is characterized by the use of a plurality of desiccant beds of which one is employed as a dryer for removing water from gases leaving the gas scrubber while the other is being regenerated by hot gases enroute to said scrubber. Thus the water which is removed from the desiccant during the desiccant regeneration or drying step is scrubbed out of the gases in the water scrubbing step before the gases are finally dried by the on-stream desiccant.

The invention will be more clearly understood from the following detailed description of a specific example thereof read in conjunction with the accompanying drawing which forms a part of this specification and which is a schematic flowsheet of my improved reaction-regeneration system.

In this example the hydroforming is effected with a platinum-on-alumina catalyst containing about 0.6 percent platinum. Any known type of platinum alumina hydroforming catalyst may be employed and it may be prepared by combining halogen with alumina prior to depositing platinum thereon as described in Haensel 2,479,109 or by simply compositing platinum chloride on an alumina support as described in U.S. 2,659,701. The invention is not limited to platinum-on-alumina catalyst but is applicable to catalysts wherein the platinum is supported on silica-alumina or any other effective support for the platinum.

In the example illustrated in the drawing, a Mid-Continent naphtha is charged to the system from source 10 by pump 11 and line 12, mixed with recycle hydrogen from line 13 and preheated in heater 14 to a temperature of about 875° to 975° F., e.g. 925° F., under a pressure in the range of about 200 to 400, e.g. about 300, p.s.i.g. The naphtha charge in this case has a boiling range of about 150 to 360° F., it contains about .02 percent sulfur, about 1 to 3 parts per million of chloride and about 2 to 10 parts per million of water.

The preheated naphtha-hydrogen stream is introduced by line 15 into first reactor 16 which contains sufficient platinum alumina catalyst to provide a weight space velocity in this reactor of about 5 to 20, e.g. about 10, pounds of naphtha per hour per pound of catalyst. The effluent stream from reactor 16 is passed by line 17 through reheater 18 and transfer line 19 to second reactor 20 which may contain about the same amount or somewhat more catalyst than employed in the first reactor. The effluent from reactor 20 is passed by line 21 through reheater 22 and transfer line 23 to third reactor 24 which may contain about the same amount or slightly more catalyst than in the preceding reactors. The effluent from reactor 24 is passed through line 25, reheater 26 and transfer line 27 to fourth reactor 28 which may contain approximately the same amount or slightly more catalyst than reactor 24. Effluent from reactor 28 is passed by line 29 through reheater 30 and transfer line 31 to tail reactor 32 which may contain the same amount of catalyst as reactor 28.

The final effluent stream from reactor 32 is passed by line 33 through exchanger 34 and cooler 35 to separator 36 from which the separated hydrogen stream is withdrawn through line 37. Most of this hydrogen stream is recycled by compressor 38 through line 13 as heretofore described, the amount of recycled hydrogen stream being preferably about 2,000 to 10,000 cubic feet per barrel of naphtha charge, e.g. about 5,000 cubic feet per barrel. Any net production of hydrogen is vented through line 37a and the condensable hydrocarbons contained therein may be recovered in any suitable absorber or known recovery means.

The liquid from separator 36 is introduced into stabilizer 39 from which any propane and lighter hydrocarbons are withdrawn through line 40 and the hydroformed naphtha is withdrawn through line 41. It should be understood that any known type of product recovery system may be employed.

While a five-reactor system has thus been described, it should be understood that the invention is applicable to a system containing a lesser or greater number of reactors. The inlet temperature to each reactor is preferably in the range of 875 to 975° F. although it may be desirable to employ inlet temperatures in the final reactors somewhat higher than inlet temperatures employed in the initial reactors. The pressure will, of course, gradually decrease due to the pressure drops in the reactors, reheaters and connecting lines and, for a so-called 300 p.s.i. operation, the inlet pressure at the first reactor inlet may be about 340 p.s.i. and the pressure at the tail reactor outlet may be about 250 p.s.i. or less.

When the catalyst in any one of the reactors declines in activity because of accumulation of carbonaceous deposits, that particular reactor may be taken off-stream and regenerated. Assuming, for example, that the temperature drop in the catalyst bed in reactor 28 decreases to such an extent as to indicate an undesirable loss of catalyst activity, the cut-off valve in line 27a is opened and the cut-off valve in line 27 is closed, reactor 28 being further isolated by closing the valve in line 29. Similarly, cross-over line 15a could be employed to by-pass reactor 16, cross-over line 19a to by-pass reactor 20 and cross-over line 23a to by-pass reactor 24. Reactor 32 may be by-passed by line 29a. As thus described and illustrated in the drawings, all of the cross-over lines except line 29a in effect connect two heaters to operate in series so that the firing in one of these heaters must be decreased. If the system is to be operated a constant product octane number, it would be necessary to increase the temperatures in at least certain, and preferably all, of the reactors to compensate for the fact that a fewer number of reactors is on-stream. Alternatively, of course, the naphtha charge rate to the system may be diminished to the required extent.

When one of the reactors, such as reactor 28, is thus bypassed and blocked off, it is desirable to first purge the catalyst bed with hydrogen in order to remove hydrocarbons therefrom. This may be accomplished by providing a hydrogen purge line 42 with valved inlet lines 43, 44, 45, 46 and 47 communicating with the respective reactors or with lines entering said reactors. Thus when the valve in line 27 is closed, the valve in line 46 is opened and the catalyst bed in reactor 28 is thus purged with hydrogen, the valve in line 29 being closed after this purging operation and after valve 46 has likewise been closed.

After the purging step hydrogen is stripped from blocked-off reactor 28 either by means of a hydrocarbon gas such as methane or by flue gas. Flue gas is introduced to the system from source 48 and compressor 49 and is introduced by lines 50 and 51 to the base of water scrubber 52 into which cool water is introduced through line 53 and from which water is removed by line 54. The scrubbed flue gas then passes through lines 55, 56 and 57 through desiccant bed 58 wherein residual water is removed from the gas. The desiccant is preferably a silica or alumina adsorbent and two desiccant beds are employed so that while the desiccant 58 is being dried or "regenerated" the flue gas stream may pass through line 60 and desiccant bed 61 and thence through line 62 to line 63. The dried flue gas in then compressed by compressor 64, passed through heat exchanger 65, line 66, heater 67 and line 68 from which the flue gas may be introduced into a selected reactor by one of the valved lines 69, 70, 71, 72 or 73. During purging and regeneration steps gases may be removed from a selected reactor through lines 74, 75, 76, 77 or 78, each of which communicates with line 79 which in turn is connected with valved vent line 80. When it is desired to recycle flue gases during regeneration, the valve in line 80 may be closed and the gases from line 79 may be passed by line 81, heat exchanger 65 and lines 82 and 51 back to the water scrubber 52. During such recycle operation the gases in lines 79 and 81 may be at a temperature of about 1050° F. and these gases may be cooled to about 650° F. in heat exchanger 65. At this temperature a part or all of the gases may be passed through line 83 and desiccant bed 58 and thence back by line 84 to line 82 for drying desiccant bed 58 while desiccant bed 61 is being employed in on-stream position for removing water from scrubbed flue gas. After water has thus been removed from desiccant bed 58, the valve in line 82 is opened, valves in lines 83 and 84 are closed, valves in lines 57 and 59 are opened, valves in lines 60 and 62 are closed and valves in lines 85 and 86 are opened so that the hot gases from line 82 may be passed through desiccant bed 61 in order to effect drying or regeneration thereof. Thus the hot gases produced by catalyst regeneration provide the heat required for drying the desiccant and water removed from the desiccant is scrubbed out of the gases in scrubber 52 which serves to remove from these gases the water of combustion formed by the burning of carbonaceous deposits during regeneration.

Since it may be desirable to avoid contacting catalyst simultaneously with hydrogen and carbon oxides, it is preferred to effect purging steps with a hydrocarbon gas such as methane which may be introduced from source 87 by compressor 88 through line 89 and valved, branched lines 90, 91, 92, 93 and 94. Thus after hydrocarbons have been purged from the reactor 28 with hydrogen and this reactor has been isolated, the valve in line 77 may be opened and the reactor may be depressured by venting hydrogen through lines 79 and 80 to a suitable receiver or flare. Hydrogen may next be stripped out of reactor 28 by opening the valve in line 93 while the valves in lines 77 and 80 remain open. Next, the valve in line 93 is closed and flue gas is introduced at the base of reactor 28 by opening the valve in line 72 whereby all methane is displaced from the reactor and from lines 77 and 79 through line 80.

After this purging step the valve in line 80 is closed, the valve in line 81 is opened and flue gas pressure is allowed to build up in the reactor, the flue gas then flowing through line 81, heat exchanger 65 and line 82 back to water scrubber 52. The back pressure control valve in flue gas vent line 55a is now set to maintain a back pressure of approximately 300 p.s.i.g., i.e. a pressure corresponding to that portion of the system in which the blocked-out reactor is located. When the circulating flue gas has reached the desired pressure and the catalyst in reactor 28 has been brought to a temperature of about 650 to 750° F. by proper control of heater 67, a small amount of air is introduced into the system from source 95 by compressor 96, the amount being controlled to prevent the combustion zone in the blocked-out catalyst bed from exceeding about 1050° F. The combustion of carbonaceous deposits on the catalyst is thus initiated and is continued until the combustion zone traverses the catalyst bed. The water formed by combustion is scrubbed out of the recycled flue gas by water scrubber 52, the net production of flue gas is vented through vent line 55a and the scrubbed flue gas is further dried by the on-stream desiccant before it is returned to the catalyst bed which is undergoing regeneration. By this technique the water content of gases which contact the catalyst bed is maintained at a much lower value than has heretofore been possible and the extra drying is effected with very little expense because the desiccant beds are alternately dried by the hot combustion gases which are subsequently water scrubbed.

Usually a catalyst may be regenerated many times before rejuvenation thereof is required. After regeneration, the catalyst bed should be reheated to about 900 to 950° F, by raising the temperature of heater 67 while recirculating the flue gas stream. When no rejuvenation is required the blocked-out reactor may then be depressured by opening valve 80 and it may be again purged with methane as heretofore described. After the methane purge, valves 93 and 97 are closed and the reactor is pressured with hydrogen introduced by opening valve 46. Next, the valve in line 29 is opened, the valve in line 27 is opened and the valve in line 27a is closed so that reactor 28 is again placed in on-stream position.

Each of the other reactors in any desired sequence may be similarly blocked-out and regenerated while the remaining reactors are on-stream. Thus it is seldom necessary to shut down the whole plant and whenever a blocked-out reactor is again placed on-stream, there is ample hydrogen in the system to facilitate its assuming on-stream position without excessive production of carbonaceous deposits.

When rejuvenation is to be effected, special precautions must be taken to prevent any leakage of hydrogen into a zone of high oxygen partial pressure and to prevent any leakage of oxygen into a hydrogen gas stream. Thus, if it is desired to effect rejuvenation of catalyst in reactor 28, line 27 should be equipped with double block valves or spaced blinds with provision for introducing a seal gas between the valves or blinds at a higher pressure than the pressure on either side thereof to insure against any possible leakage of hydrogen into the oxygen system or oxygen into the hydrogen system. When a reactor is thus blocked off with a double valve and seal system, it may be rejuvenated after regeneration by stopping the introduction of flue gas from source 48 while continuing the introduction of air from source 95 and maintaining the temperature of the circulating air stream in the range of about 950 to 1050° F. for a period of about .2 to 12 hours at said pressure of about 300 p.s.i. After this rejuvenation period, the air flow is stopped and oxygen is purged from the system with flue gas prior to the final methane purge which precedes the reintroduction of hydrogen. Since the requirement for catalyst rejuvenation is far less frequent that that of catalyst regeneration and since it is usually desirable to shut down the plant every one or two years for complete overhaul and inspection, it is preferred to equip only the final two or three reactors for rejuvenation, thereby saving the cost of additional block valves, blinds, sealing gas systems, etc. for the earlier reactors. During a shut-down period the catalyst may be interchanged between the final reactors and the initial reactors so that all catalyst may be utilized to the fullest extent before it is reprocessed.

From the foregoing description it will be apparent that the objects of my invention have been achieved. The use of cross-over lines for blocking out reactors is less expensive than the swing reactor system heretofore employed. Additional investment costs are saved by providing only the later reactors with the additional equipment necessary for effecting rejuvenation. The additional drying of recycled flue gas decreases to a remarkable extent the loss of catalyst activity which would otherwise be caused by the presence of moisture during regeneration and purging, yet the cost of this additional drying step is remarkably small.

It should be pointed out that all of the reactors and that portion of the inlet and outlet lines between cut-off valves are preferably aluminized, i. e. coated with aluminum metal, by either a dipping or spraying technique. Cross-over lines 15a, 19a, etc. may by-pass not only the particular reactor but also the reheater following said reactor. Cross-over lines may also be provided to by-pass two or more of the reactors.

While a specific example of the invention has been described in considerable detail, alternate arrangements and operating conditions will be apparent from the above description to those skilled in the art.

I claim:

1. In a regenerative, supported-platinum-catalyst, naphtha hydroforming system which comprises a plurality of catalyst-containing reactors, heaters for preheating naphtha streams introduced into each reactor, a regeneration system including a flue gas cooler, dryer, circulator and heater and connections between each reactor and the regeneration system, an improved flue gas dryer which comprises first and second desiccant chambers, connections for passing flue gas from the cooler through said first desiccant chamber before said flue gas is introduced into said reheater, connections for passing hot flue gas through said second desiccant chamber before said flue gas is introduced into said cooler, a connection for removing water condensed from the flue gas in said cooler and connections for alternating the flow of gases through said first and second desiccant chambers.

2. A supported platinum catalyst naphtha hydroforming system which comprises at least four fired heaters each having an inlet line and a transfer line, at least four reactors each containing a bed of supported platinum catalyst and having a valved inlet line and a valved outlet line, said lines being connected so that when all valves are open, a gaseous stream passes in series through the first heater, first reactor, second heater, second reactor, third heater, third reactor, fourth heater, and fourth reactor, a heat exchanger, a gas separator, connections for passing effluent from the fourth reactor through the exchanger to the separator and for recycling gas from the separator through the exchanger to the first heater inlet, a valved line directly connecting the first heater transfer line to the second heater inlet, a valved line directly connecting the second heater transfer line to the third heater inlet, a valved line directly connecting the third heater transfer line to the fourth heater inlet, a valved line directly connecting the outlet of the third reactor with the outlet of the fourth reactor, whereby any selected one of the reactors may be taken off stream for regeneration in any desired sequence while the other three reactors remain on stream, double block valves with a seal gas inlet line therebetween in the gas lines leading to and from the last and the next-to-the last reactors, and connections for introducing purge and regeneration gases to and for removing such gases from each reactor when it is in off stream position said regeneration gas connections communicating with said last named gas lines between said double block valves and the respective reactor.

3. A supported platinum catalyst naphtha hydroforming system which comprises at least four fired heaters each having an inlet line and a transfer line, at least four reactors each containing a bed of supported platinum catalyst and having a valved inlet line and a valved outlet line, said lines being connected so that when all valves are open, a gaseous stream passes in series through the first heater, first reactor, second heater, second reactor, third heater, third reactor, fourth heater, and fourth reactor, a heat exchanger, a gas separator, connections for passing effluent from the fourth reactor through the exchanger to the separator and for recycling gas from the separator through the exchanger to the first heater inlet, a valved line directly connecting the first heater transfer line to the second heater inlet, a valved line directly connecting the second heater transfer line to the third heater inlet, a valved line directly connecting the third heater transfer line to the fourth heater inlet, a valved line directly connecting the outlet of the third reactor with the outlet of the fourth reactor, whereby any selected one of the reactors may be taken off stream for regeneration in any desired sequence while the other three reactors remain on stream, and means for introducing purge and regeneration gases to and for removing such gases from each reactor when it is in off stream position, said last named means comprising an upper regeneration gas manifold selectively connected by valved lines to the upper part of each reactor, a lower regeneration gas manifold selectively connected by valved lines to the bottom of each reactor, a water scrubbing tower, a circulating gas compressor, a gas heater, connections from one of the gas manifolds to the scrubber, thence to the compressor, thence to the heater and thence to the other of said manifolds, said connections forming a closed gas circuit and including two desiccant towers connected in parallel, valved connections for selectively passing gas from the manifold to the scrubber through one of said desiccant towers and valved connections for selectively passing gas from said scrubber to the other of said desiccant towers to the circulating gas compressor whereby moisture is removed from one of said desiccant towers by hot gases from the regeneration gas manifold and is eliminated from the system from the water scrubbing tower while residual moisture contained in gases from the water scrubbing tower are being absorbed in the other desiccant tower, at least one connection for venting gas from said circuit and connections for introducing air and flue gas to said circuit.

References Cited in the file of this patent

UNITED STATES PATENTS

| | | |
|---|---|---|
| 1,541,147 | Ikeda et al. | June 9, 1925 |
| 2,274,003 | Sheppard | Feb. 24, 1942 |
| 2,276,690 | Germany | Mar. 17, 1942 |
| 2,310,244 | Lassiat | Feb. 9, 1943 |
| 2,357,365 | Van Horn et al. | Sept. 5, 1944 |
| 2,357,531 | Mather et al. | Sept. 5, 1944 |
| 2,364,453 | Layng et al. | Dec. 5, 1944 |
| 2,365,893 | Mather et al. | Dec. 26, 1944 |
| 2,474,014 | Seebold | June 21, 1949 |
| 2,509,900 | Wormith | May 30, 1950 |
| 2,578,704 | Houdry | Dec. 18, 1951 |
| 2,746,909 | Hemminger | May 22, 1956 |
| 2,773,013 | Wolf et al. | Dec. 4, 1956 |
| 2,773,014 | Snuggs et al. | Dec. 4, 1956 |